US012645887B2

(12) United States Patent
Shoshan

(10) Patent No.: US 12,645,887 B2
(45) Date of Patent: Jun. 2, 2026

(54) MULTI-SIDED INTELLIGENT LARGE LANGUAGE MODEL ASSISTANT

(71) Applicant: SAP SE, Walldorf (DE)

(72) Inventor: Itzhak Shoshan, Even Yehuda (IL)

(73) Assignee: SAP SE, Walldorf (DE)

( * ) Notice: Subject to any disclaimer, the term of this patent is extended or adjusted under 35 U.S.C. 154(b) by 285 days.

(21) Appl. No.: 18/402,320

(22) Filed: Jan. 2, 2024

(65) Prior Publication Data

US 2025/0217174 A1     Jul. 3, 2025

(51) Int. Cl.
G06F 40/35      (2020.01)
G06F 40/40      (2020.01)
G06N 20/00      (2019.01)

(52) U.S. Cl.
CPC .............. G06F 40/35 (2020.01); G06F 40/40 (2020.01); *G06N 20/00* (2019.01)

(58) Field of Classification Search
CPC .......... G06F 40/35; G06F 40/40; G06F 9/453; G06N 20/00; G06N 3/006; G06N 3/044; G06N 3/045; G06N 3/08; G06N 3/084
See application file for complete search history.

(56) References Cited

U.S. PATENT DOCUMENTS

2015/0185996 A1* 7/2015 Brown ................ G06F 3/04817
                                                715/706
2023/0074406 A1* 3/2023 Baeuml ............. G06F 16/90332
2023/0343324 A1* 10/2023 Baeuml ................... G10L 13/08

OTHER PUBLICATIONS

Chen et al. "AutoAgents: A Framework for Automatic Agent Generation" arXiv:2309.17288v2 [cs:AI] Oct. 15, 2023 (Year: 2023).*

* cited by examiner

*Primary Examiner* — Daniel C Washburn
*Assistant Examiner* — Penny L Caudle
(74) *Attorney, Agent, or Firm* — SCHWEGMAN LUNDBERG & WOESSNER, P.A.

(57)      ABSTRACT

In an example embodiment, a system is provided having multiple software assistants act as an interface to one or more LLMs. These assistants share contextual information about an ongoing shared conversation, but otherwise direct their respective LLM(s) to generate content based on the assistants' individual personas. The result is that a single conversation can include generated content from one or more LLMs based on multiple different personas.

20 Claims, 5 Drawing Sheets

300

CREATE A FIRST PERSONA BY A FIRST SOFTWARE ASSISTANT *302*

CREATE A SECOND PERSONA BY A SECOND SOFTWARE ASSISTANT *304*

RECEIVE FIRST REQUEST FOR GENERATED CONTENT *306*

PASS FIRST REQUEST TO FIRST SOFTWARE ASSISTANT *308*

PROMPT FIRST LLM TO GENERATE CONTENT BASED ON THE FIRST REQUEST *310*

RECEIVE CONTENT GENERATED BASED ON THE FIRST REQUEST *312*

PRESENT CONTENT GENERATED BASED ON THE FIRST REQUEST TO THE USER *314*

RECEIVE SECOND REQUEST FOR GENERATED CONTENTT *316*

PASS SECOND REQUEST TO SECOND SOFTWARE ASSISTANT *318*

PROMPT SECOND LLM TO GENERATE CONTENT BASED ON THE SECOND REQUEST, USING FIRST REQUEST AND CONTENT GENERATED BASED ON THE FIRST REQUEST AS CONTEXT *320*

RECEIVE CONTENT GENERATED BASED ON THE SECOND REQUEST *322*

PRESENT THE CONTENT GENEREATED BASED ON THE SECOND REQUEST *324*

MULTI-SIDED INTELLIGENT LARGE LANGUAGE MODEL ASSISTANT

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
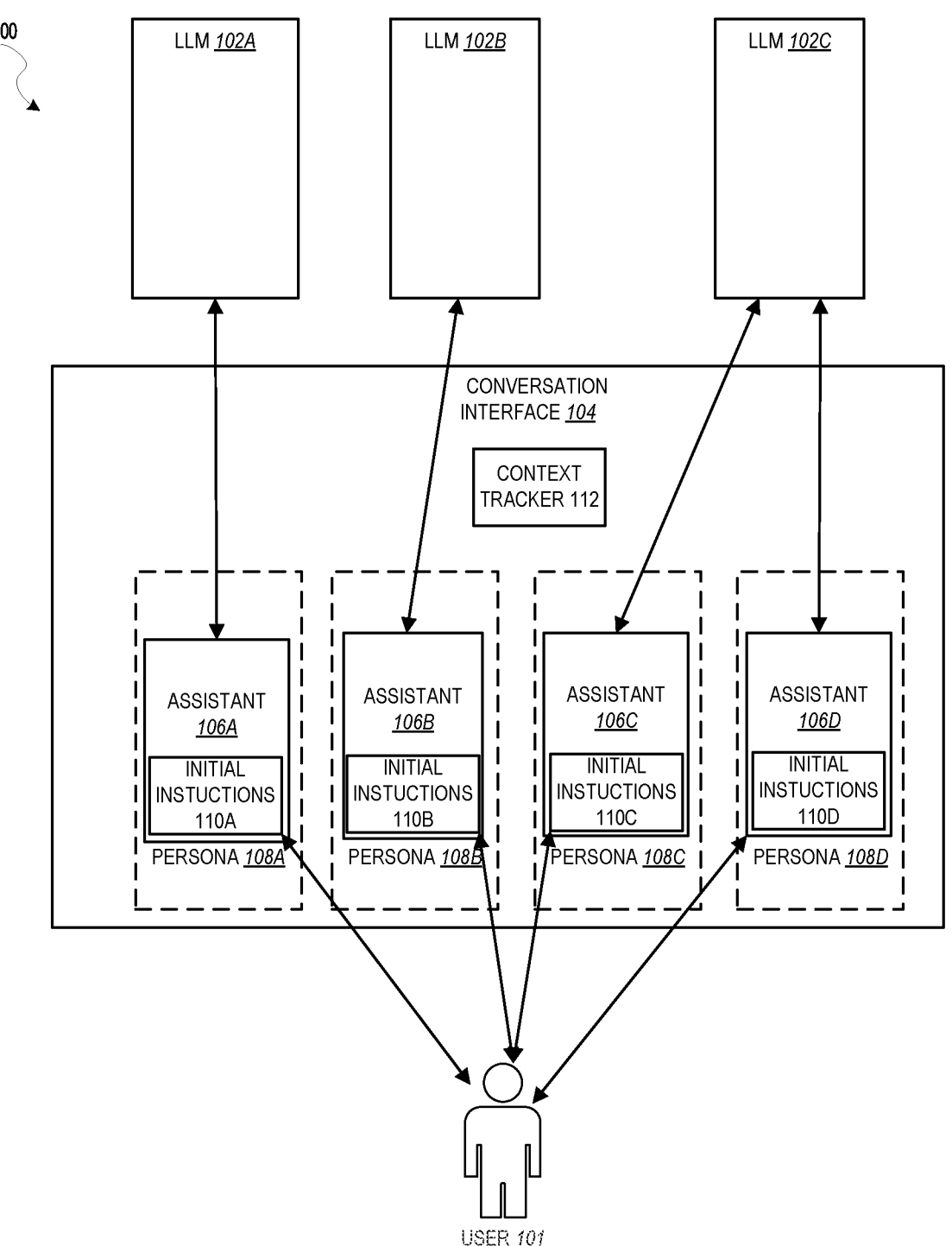
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Typically, users interact with LLMs using some sort of assistant, such as an LLM-based chat-bot. The assistant is a computer program designed to facilitate such interaction. Typically, this assistant has its role as assistant, which includes receiving messages from a user and sending them for processing by the LLM (using appropriate prompts), and then receiving the content generated by the LLM for presenting back to the user. Typically, this assistant also has a system role, which involves establishing the initial instructions for the LLM to follow when generating content, such as a brief description of the assistant, personality traits, instructions or rules that the assistant should follow, and the like.

Existing technology, however, limits interaction of the LLM to a singular assistant, which results in the user only being presented with a single viewpoint/perspective when seeing generated content. For example, if the user submits the request "please tell me what the future of artificial intelligence will look like.", the content generated based on that request will be generated based upon the "persona" of the particular assistant, using the assistant's particular brief description, personality traits, and other instructions, for generating the content. If the assistant's persona has some sort of bias or other trait that would cause potentially incorrect or at least non-holistic answers to be generated, the user may be getting an incorrect or at least non-holistic perspective.

It would be beneficial to have a system where a user is able to be presented with generated LLM content from multiple different perspectives. Engaging LLMs with various perspectives leads to more comprehensive responses, reflecting the diversity of opinions and approaches in a domain. By navigating through different viewpoints, LLMs can better comprehend the reasons behind these differences, leading to more insightful responses. Exposure to multiple perspectives provides LLMs with a wider range of data to learn from, enhancing generalization abilities and overall performance. Furthermore, by presenting multiple perspectives, LLMs can encourage users to think critically and evaluate different viewpoints.

In an example embodiment, a system is provided having multiple software assistants act as an interface to one or more LLMs. These assistants share contextual information about an ongoing shared conversation, but otherwise direct their respective LLM(s) to generate content based on the assistants' individual personas. The result is that a single conversation can include generated content from one or more LLMs based on multiple different personas.

For purposes of this disclosure, the term "persona" should not be interpreted literally to mean an identity of an actual person, but instead reflects a distinct identity of an LLM, as defined by a system role of a corresponding assistant. In other words, the assistant defines the meets and bounds of the persona. This can be accomplished through the initial instructions described earlier. Each unique set of initial instructions can be considered to create a separate persona, even if the different set of initial instructions are being applied to the same LLM. In such a case, that single LLM could be considered to have multiple personas, although as will be described later there is no requirement that more than one persona be applied to any single LLM.

In some example embodiments, one or more of the personas attempt to replicate or imitate the personas of actual humans, whether at the specific individual level (e.g., a famous celebrity) or at a more generic level (e.g., a hypothetical CEO based off of a combination of many actual, real-world CEOs). However, despite the term "persona" being used, there is nothing requiring that the persona actually be representative of a person, either at an individual level or a collective level. The persona could be representative of anything that the initial instructions to the LLM request it to be. Examples of non-human personas include personas of objects (e.g., the family sedan, a house, etc.), animals (a dog, a cat, etc.), or fictional or unproven entities (e.g., an outer-space alien, a character from a movie, etc.).

FIG. 1 is a block diagram illustrating a system 100, in accordance with an example embodiment. Here, the system 100 includes a user 101 engaging in a conversation with one or more LLM 102A, 102B, 102C via a conversation interface 104. The conversation interface 104 includes a separate assistant 106A, 106B, 106C, 106D for each of a plurality of different personas 108A, 108B, 108C, 108D.

Each assistant 106A, 106B, 106C, 106D includes a set of initial instructions 110A, 110B, 110C, 110D, respectively, that are passed to their corresponding LLM 102A, 102B, 102C to create the personas 108A, 108B, 108C, 108D.

Notably, while assistant 106A and 106B (and thus persona 108A and 108B, respectively) correspond to individual distinct LLMs 102A, 102B, assistant 106C and 106D (and thus persona 108C and 108D, respectively) correspond to a shared LLM 102C. This is merely illustrative. In practice, any assistant can correspond to any LLM, whether shared or not. In some examples, all four assistants 106A, 106B, 106C, 106D could have corresponded to a single shared LLM whereas in other examples, each assistant 106A, 106B, 106C, 106D could have corresponded to its own independent LLM.

Regardless of the number and sharing of LLMs, the conversation interface 104 manages communications to and from the different assistants 106A, 106B, 106C, 106D and the user 101. These communications may be tracked in a context tracker 112, which tracks the context that is going to be shared among all of the assistants 106A, 106B, 106C, 106D. This context may include, for example, a running transcript of the conversation occurring among the assistants 106A, 106B, 106C, 106D and the user 101. Notably, this context is shared among all of the assistants 106A, 106B, 106C, 106D regardless of whether or not the individual assistants 106A, 106B, 106C, 106D are the ones actually being interacted with. Thus, for example, the user 101 may first ask a question (e.g., "can you tell me the future of artificial intelligence?") of persona 108A, which causes the conversation interface 104 to send that question to assistant 106A, which then processes and sends a corresponding prompt to LLM 102A, which generates a response. The assistant 106A then sends this response to the user 101. The context tracker 112 tracks both the question asked by the user to assistant 106A and the generated response from LLM 102A and passes both of these pieces of information as context to all of the assistants 106A, 106B, 106C, 106D. Thus, if a user then follows up the original question by saying "persona 108B, do you have anything to add to that response" then assistant 106B has the available context for that question so that LLM 102B can generate a response that, while reflecting the persona of 108B, reflects the original question directed to persona 108A and the response of persona 108A.

When using LLMs to generate text, the amount of input tokens fed to the LLM and the amount of output tokens generated by the LLM can affect both cost and performance. On the input side, tokens are generally used as input to LLMs to help provide context for the LLM to generate the text. The result is more robust if the user provides more guidance, such as by specifying the desired data structure with examples or specifications.

It should further be noted that while the above depicts an interaction between a single user 101 and a single persona 108A, 108B, 108C, 108D at a time, there is no requirement that the interactions be so limited. Embodiments are possible where, for example, a user may direct an interaction to multiple personas simultaneously, or where a first persona generates a question to a second persona based on a question asked by the user of the first persona.

FIG. 1 depicts an embodiment where contextual information is derived solely from the ongoing conversation occurring in the conversation interface 104. Thus, each LLM 102A, 102B, 102C generates its content based on the initial instructions passed to it from a corresponding assistant 106A, 106B, 106C, 106D, the contextual information from the ongoing conversation, and whatever other contextual information the corresponding assistant 106A, 106B, 106C, 106D wishes to pass to it. Such an embodiment, however, can run into technical limitations in scenarios where the assistant 106A, 106B, 106C, 106D wishes to pass large amounts of contextual information.

Figure 2:
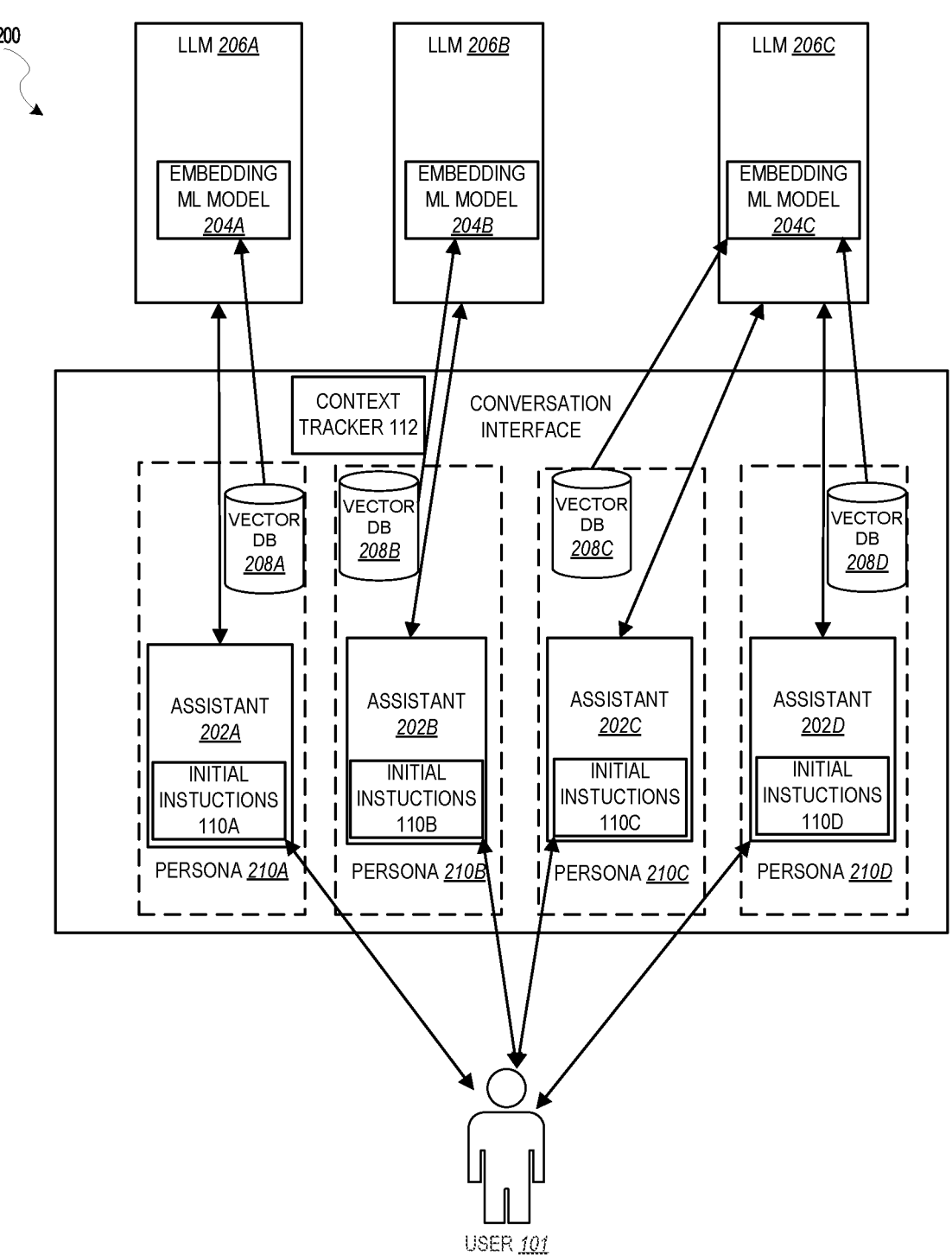
FIG. 2 is a block diagram illustrating a system in accordance with another example embodiment.

LLMs have absolute limits on the number of input tokens they will accept, thus limiting the overall amount of context that an assistant 106A, 106B, 106C, 106D can actually pass to it. FIG. 2, however, describes a work-around for this technical limitation. LLMs typically utilize embeddings to represent the meaning of content. Each piece of content may be assigned an embedding, namely a set of coordinates in a latent n-dimensional space, by an embedding machine learning model, which is a machine learning model that has been trained specifically to derive and assign meaning to content. The embedding for a piece of content represents a point in that n-dimensional space that best represents the meaning of the piece of content, such that mathematical operations can be performed to derive the similarity of the piece of content to another piece of content using geometrical calculations. For example, if a point representing content A is closer to a point representing content C than it is to a point representing content B, then this means that the embedding machine learning model is indicating that content A is more similar to content C than it is to content B. An LLM uses a corresponding embedding machine learning model to aid in its understanding of the meaning of pieces of content.

In an example embodiment, this same embedding machine learning model used by a corresponding LLM is used to generate embeddings of contextual content requested by a corresponding assistant. FIG. 2 is a block diagram illustrating a system 200 in accordance with another example embodiment. Here, each assistant 202A, 202B, 202C, 202D can request that an embedding machine learning model 204A, 204B, 204C corresponding to a connected LLM 206A, 206B, 206C embed additional contextual content and store it in a corresponding vector database 208A, 208B, 208C, 208D. The corresponding LLMs 206A, 206B, 206C then can be directed to check for embeddings in a corresponding vector database 208A, 208B, 208C, 208D, in addition to using whatever contextual information is actually passed to it by an assistant 202A, 202B, 202C, 202D. Thus, for example, if a persona 210A associated with assistant 202A corresponds to an actual real life person such as a particular celebrity, then the assistant 202A may wish to inform the corresponding LLM 206A of any contextual information it can find about the celebrity (e.g., transcripts of interviews conducted with the celebrity, books written by or about the celebrity, copies of movies and television shows in which the celebrity appeared, etc.). Rather than pass this additional contextual information directly to the LLM 206A, which would likely surpass the hard token limit imposed by the LLM 206A and thus not be totally considered, the assistant 202A can request that embedding machine learning model 204A create embeddings for each piece of content in this additional contextual information and store those embeddings in vector database 208A. Thus, when LLM 206A actually generates content based on persona 210A, it draws the embeddings from the vector database 208A and is able to fully utilize the additional contextual information when generating content.

An embedding is a representation of a value of a feature in a dimensional space, which allows a system to perform distance-related measurements when comparing two values of features. Essentially the process of embedding involves learning how to convert discrete symbols, such as words, into continuous representations in a dimensional space. For example, a sequence of text like an article can be embedded into a single vector. In this context, vector refers to the computer science version of the term, i.e., an array of values, as opposed to the mathematical version of the term (meaning a line with a direction). The vector of values represents coordinates in an n-dimensional multidimensional space (with n being the number of values in the vector).

Embeddings can be created using machine learning models specifically for the embeddings, or at least specialized layers within other machine learning models. These embedding models/layers therefore rely on extensive training of their own, on top of the training needed for the machine learning model in which the embeddings will be fed as input. As such, in the present disclosure, while the concept of an embedding model is described separately from the concept of an LLM, in some instances these models may be combined into a single large model.

The embedding machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the embedding machine learning algorithm used to train the machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the embedding machine learning model may take place as a dedicated training phase. In other example embodiments, the embedding machine learning model may be retrained dynamically at runtime by the user providing live feedback.

In a further example embodiment, one or more of the LLMs 206A, 206B, 206C can be fine-tuned to be closer to its corresponding persona or personas 210A, 210B, 210C, 210D. Thus, for example, rather than relying solely on the initial instructions from assistant 202A and contextual information directly or indirectly (though vector database 208A) passed to it from assistant 202A, the LLM 206A itself may be fine tuned using, for example, contextual information as training data, to become closer to persona 210A. This fine-tuning involves retraining the LLM 206A using training data that includes some of that contextual information.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, though a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model.

There are many different example of potential use cases for this solution. A first may be for brainstorming sessions, between different personas with different perspectives. A second may be a debate with multiple participants. A third is to simulate a negotiation among multiple stakeholders. A fourth is to establish a virtual board of advisers to support a user in decision making. A fifth is adding to expert panel virtual experts.

Furthermore, the conversion interface may take many forms. While a text interaction interface where users type questions or requests and read text-based content generated by the LLMs is certainly an option, other options are possible as well, such as one in which the users provide input via voice and voice recognition software is used to translate the voice audio to text. Likewise, content generated by the LLM may either be converted to audio via text-to-audio techniques or in some cases may be generated directly as audio files for presentation aurally, making the conversation appear similar to a conversation between humans.

Figure 3:
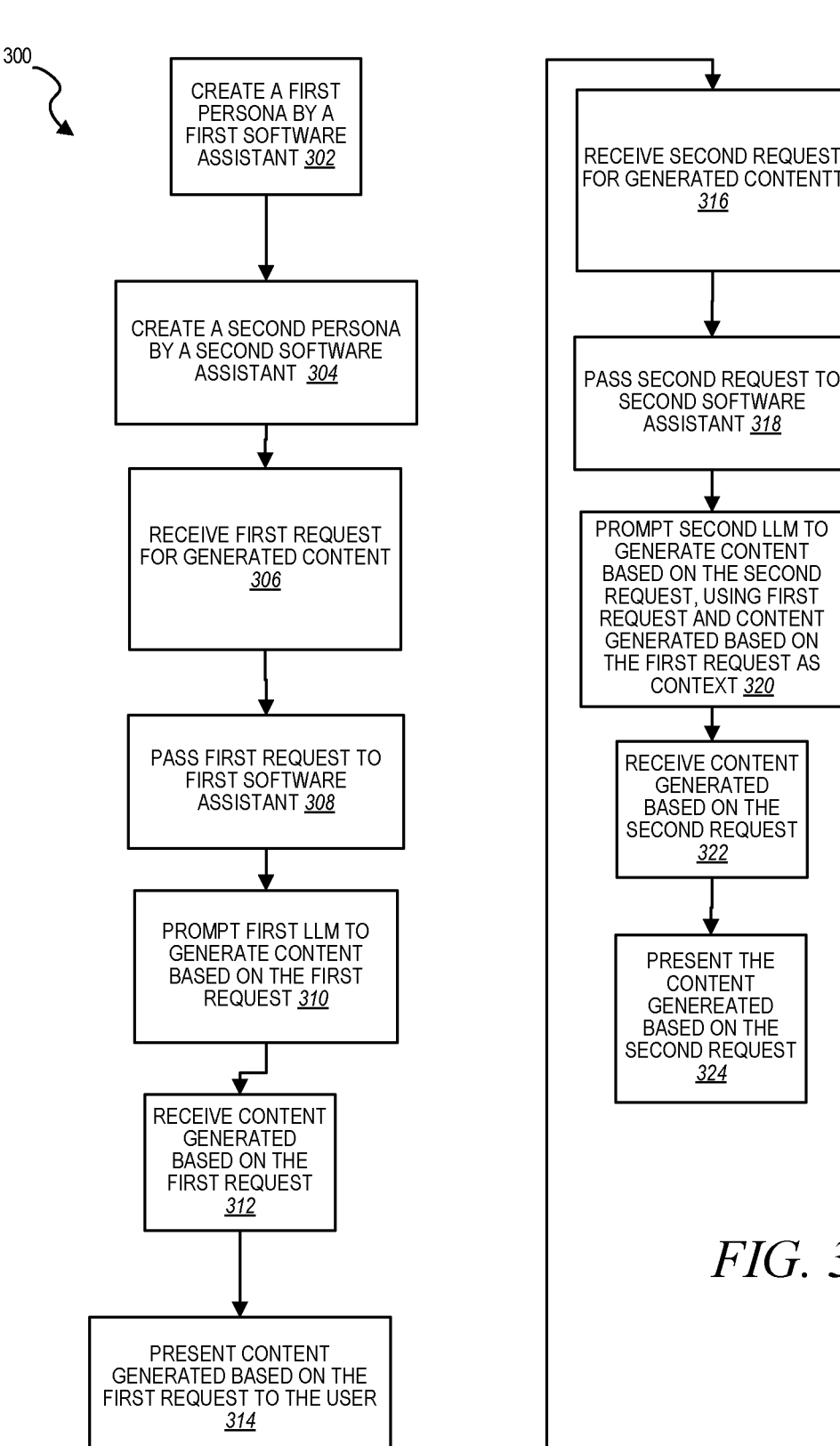
FIG. 3 is a flow diagram illustrating a method for utilizing one or more LLMs, in accordance with an example embodiment.

FIG. 3 is a flow diagram illustrating a method 300 for utilizing one or more LLMs, in accordance with an example embodiment. At operation 302, a first persona is created by a first software assistant feeding a first initial instruction set to a first LLM. At operation 304, a second persona is created by a second software assistant feeding a second initial instruction set to a second LLM. At operation 306, a conversation interface receives a first request for generated content from a user. This request may come in the form of a command or question posed by the user, either in written or verbal form. In alternative embodiments, the request may take yet another form, such as the submission of a piece of content, like an article, soliciting comments on it.

At operation 308, the first request is passed from the conversation interface to the first software assistant. At operation 310, the first software assistant prompts the first LLM to generate content based on the first request. At operation 312, content generated based on the first request is received from the first LLM. At operation 314, the content generated based on the first request is presented to the user via the conversation interface.

At operation 316, the conversation interface receives a second request for generated content from the user. At operation 318, the content generated based on the first request, and the second request are passed from the conversation interface to the second software assistant. At operation 320, the second software assistant prompts the second LLM to generate content based on the second request, using the first request and the content generated based on the first request as context. At operation 322, content generated based on the second request is received from the second LLM. At operation 324, the content generated based on the second request is presented to the user via the conversation interface.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: creating a first persona by a first software assistant feeding a first initial instruction set to a first Large Language Model (LLM); creating a second persona by a second software assistant feeding a second initial instruction set to a second Large Language Model (LLM); receiving a first request for generated content from a user; passing the first request to the first software assistant; causing the first software assistant to prompt the first LLM to generate content based on the first request; receiving content generated based on the first request from the first LLM; causing presentation of the content generated based on the first request to the user; receiving a second request for generated content from a user; passing the first request, the content generated based on the first request, and the second request to the second software assistant; causing the second software assistant to prompt the second LLM to generate content based on the second request, using the first request and the content generated based on the first request as context; receiving content generated based on the second request from the second LLM; and causing presentation of the content generated based on the second request to the user.

In Example 2, the subject matter of Example 1 includes, wherein the first LLM and the second LLM are a shared LLM.

In Example 3, the subject matter of Examples 1-2 includes, wherein the first LLM utilizes additional context information stored as embeddings in a vector database.

In Example 4, the subject matter of Example 3 includes, wherein the embeddings are generated by passing content through an embedding machine learning model.

In Example 5, the subject matter of Examples 1-4 includes, wherein the operations further comprise: passing the first request, the content generated based on the first request, the second request, and the content generated based on the second request to the first software assistant; causing the first software assistant to prompt the first LLM to generate content based on the content generated based on the second request, using the first request, the content generated based on the first request, and the second request as context, prior to receiving any user input from the user in response to the presentation of the content generated based on the second request; receiving content generated based on the content generated based on the second request from the first LLM; and causing presentation of the content generated based on the content generated based on the second request to the user.

In Example 6, the subject matter of Examples 1-5 includes, wherein the causing presentation of the content generated based on the first request to the user includes displaying text of the content generated based on the first request in a graphical user interface.

In Example 7, the subject matter of Examples 1-6 includes, wherein the causing presentation of the content generated based on the first request to the user includes converting text of the content generated based on the first request to an audio file and playing the audio file to the user.

Example 8 is a method comprising: creating a first persona by a first software assistant feeding a first initial instruction set to a first Large Language Model (LLM); creating a second persona by a second software assistant feeding a second initial instruction set to a second Large Language Model (LLM); receiving a first request for generated content from a user; passing the first request to the first software assistant; causing the first software assistant to prompt the first LLM to generate content based on the first request; receiving content generated based on the first request from the first LLM; causing presentation of the content generated based on the first request to the user; receiving a second request for generated content from a user; passing the first request, the content generated based on the first request, and the second request to the second software assistant; causing the second software assistant to prompt the second LLM to generate content based on the second request, using the first request and the content generated based on the first request as context; receiving content generated based on the second request from the second LLM; and causing presentation of the content generated based on the second request to the user.

In Example 9, the subject matter of Example 8 includes, wherein the first LLM and the second LLM are a shared LLM.

In Example 10, the subject matter of Examples 8-9 includes, wherein the first LLM utilizes additional context information stored as embeddings in a vector database.

In Example 11, the subject matter of Example 10 includes, wherein the embeddings are generated by passing content through an embedding machine learning model.

In Example 12, the subject matter of Examples 8-11 includes, passing the first request, the content generated based on the first request, the second request, and the content generated based on the second request to the first software assistant; causing the first software assistant to prompt the first LLM to generate content based on the content generated based on the second request, using the first request, the content generated based on the first request, and the second request as context, prior to receiving any user input from the user in response to the presentation of the content generated based on the second request; receiving content generated based on the content generated based on the second request from the first LLM; and causing presentation of the content generated based on the content generated based on the second request to the user.

In Example 13, the subject matter of Examples 8-12 includes, wherein the causing presentation of the content generated based on the first request to the user includes displaying text of the content generated based on the first request in a graphical user interface.

In Example 14, the subject matter of Examples 8-13 includes, wherein the causing presentation of the content generated based on the first request to the user includes converting text of the content generated based on the first request to an audio file and playing the audio file to the user.

Example 15 is a non-transitory machine-readable medium storing instructions which, when executed by one or more processors, cause the one or more processors to perform operations comprising: creating a first persona by a first software assistant feeding a first initial instruction set to a first Large Language Model (LLM); creating a second persona by a second software assistant feeding a second initial instruction set to a second Large Language Model (LLM); receiving a first request for generated content from a user; passing the first request to the first software assistant; causing the first software assistant to prompt the first LLM to generate content based on the first request; receiving content generated based on the first request from the first LLM; causing presentation of the content generated based on the first request to the user; receiving a second request for generated content from a user; passing the first request, the content generated based on the first request, and the second request to the second software assistant; causing the second software assistant to prompt the second LLM to generate content based on the second request, using the first request and the content generated based on the first request as context; receiving content generated based on the second request from the second LLM; and causing presentation of the content generated based on the second request to the user.

In Example 16, the subject matter of Example 15 includes, wherein the first LLM and the second LLM are a shared LLM.

In Example 17, the subject matter of Examples 15-16 includes, wherein the first LLM utilizes additional context information stored as embeddings in a vector database.

In Example 18, the subject matter of Example 17 includes, wherein the embeddings are generated by passing content through an embedding machine learning model.

In Example 19, the subject matter of Examples 15-18 includes, passing the first request, the content generated based on the first request, the second request, and the content generated based on the second request to the first software assistant; causing the first software assistant to prompt the first LLM to generate content based on the content generated based on the second request, using the first request, the content generated based on the first request, and the second request as context, prior to receiving any user input from the user in response to the presentation of the content generated based on the second request; receiving content generated based on the content generated based on the second request from the first LLM; and causing presentation of the content generated based on the content generated based on the second request to the user.

In Example 20, the subject matter of Examples 15-19 includes, wherein the causing presentation of the content generated based on the first request to the user includes displaying text of the content generated based on the first request in a graphical user interface.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
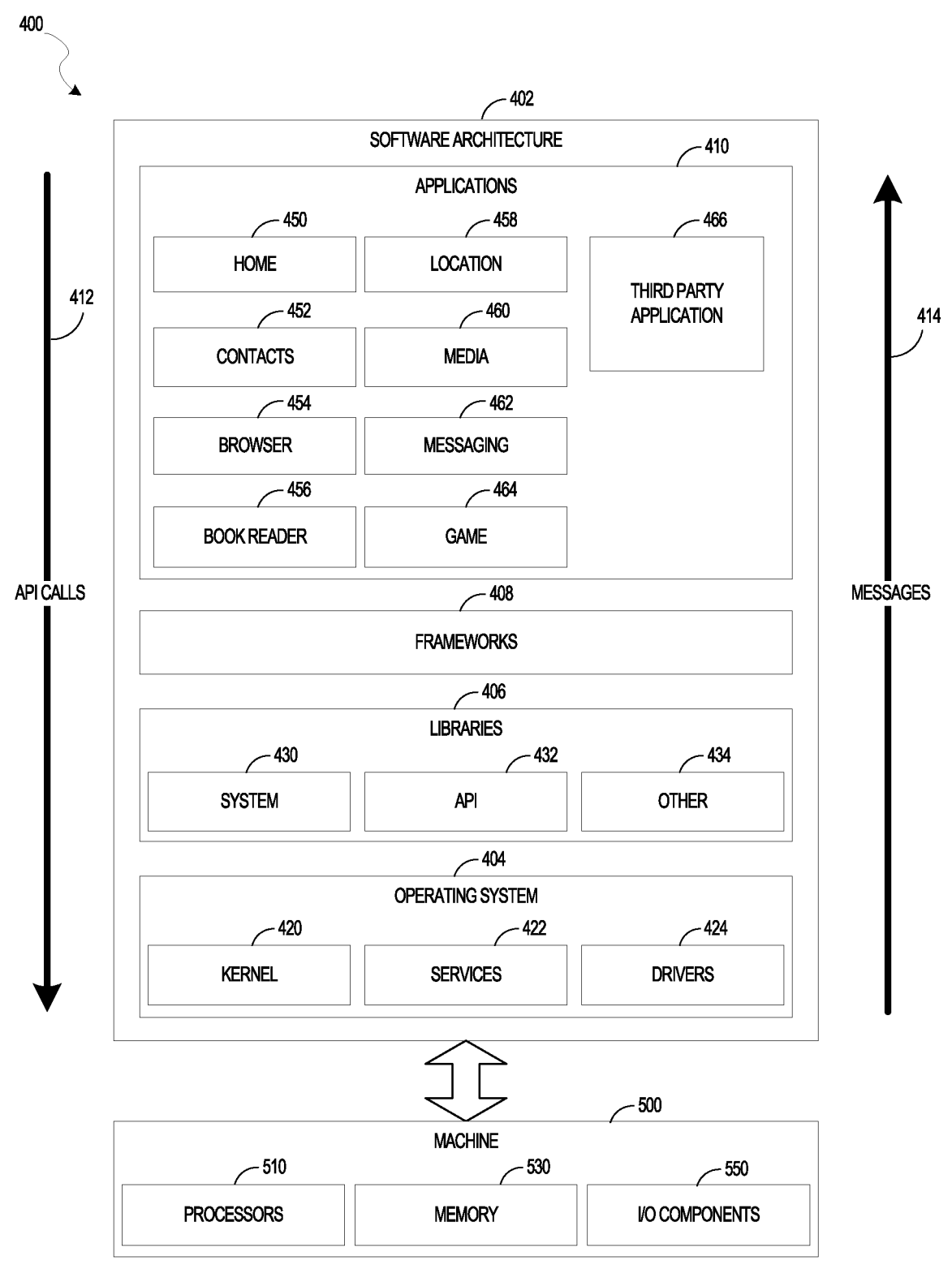
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
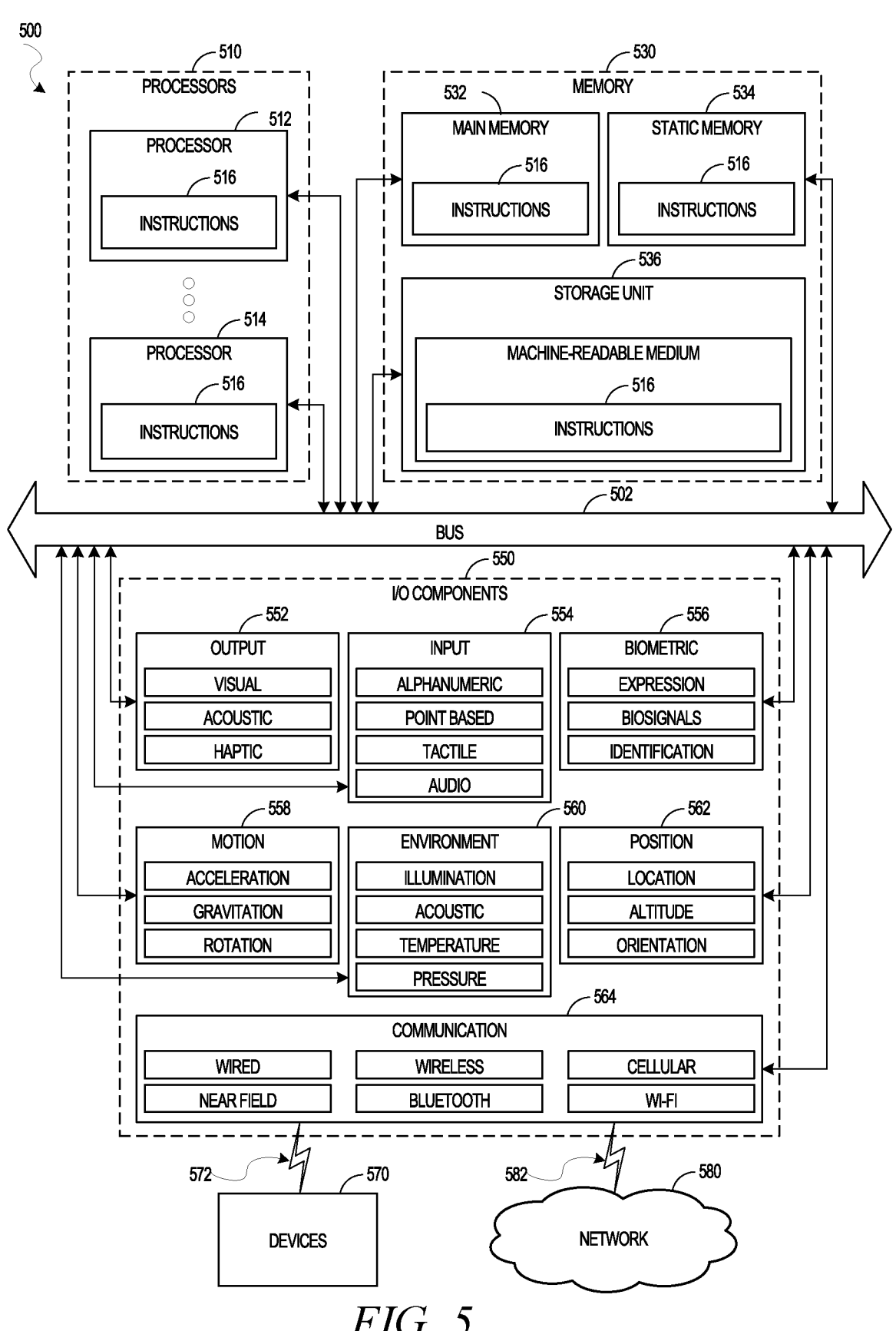
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement the systems described in FIGS. 1-2 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

creating a first persona by a first software assistant feeding a first initial instruction set to a first Large Language Model (LLM);

creating a second persona by a second software assistant, separate from the first software assistant, feeding a second initial instruction set to a second Large Language Model (LLM);

receiving a first request for first generated content from a user;

passing the first request to the first software assistant;

causing the first software assistant to prompt the first LLM to generate first content based on the first request and using the first persona;

causing presentation of the first content generated based on the first request to the user;

receiving a second request for second generated content from the user;

passing the first request, the first content generated based on the first request, and the second request to the second software assistant;

causing the second software assistant to prompt the second LLM to generate second content based on the second request and using the second persona, using the first request and the first content generated based on the first request as context, and causing presentation of the second content generated based on the second request to the user.

2. The system of claim 1, wherein the first LLM and the second LLM are a shared LLM.

3. The system of claim 1, wherein the first LLM utilizes additional context information stored as embeddings in a vector database.

4. The system of claim 3, wherein the embeddings are generated by passing content through an embedding machine learning model.

5. The system of claim 1, wherein the operations further comprise:

passing the first request, the content generated based on the first request, the second request, and the content generated based on the second request to the first software assistant;

causing the first software assistant to prompt the first LLM to generate content based on the content generated based on the second request, using the first request, the content generated based on the first request, and the second request as context, prior to receiving any user input from the user in response to the presentation of the content generated based on the second request;

receiving content generated based on the content generated based on the second request from the first LLM; and causing presentation of the content generated based on the content generated based on the second request to the user.

6. The system of claim 1, wherein the causing presentation of the content generated based on the first request to the user includes displaying text of the content generated based on the first request in a graphical user interface.

7. The system of claim 1, wherein the causing presentation of the content generated based on the first request to the user includes converting text of the content generated based on the first request to an audio file and playing the audio file to the user.

8. A method comprising:

creating a first persona by a first software assistant feeding a first initial instruction set to a first Large Language Model (LLM);

creating a second persona by a second software assistant, separate from the first software assistant, feeding a second initial instruction set to a second Large Language Model (LLM);

receiving a first request for first generated content from a user;

passing the first request to the first software assistant;

causing the first software assistant to prompt the first LLM to generate first content based on the first request and using the first persona;

causing presentation of the first content generated based on the first request to the user;

receiving a second request for second generated content from the user;

passing the first request, the first content generated based on the first request, and the second request to the second software assistant;

causing the second software assistant to prompt the second LLM to generate second content based on the second request and using the second persona, using the first request and the first content generated based on the first request as context, and causing presentation of the second content generated based on the second request to the user.

9. The method of claim 8, wherein the first LLM and the second LLM are a shared LLM.

10. The method of claim 8, wherein the first LLM utilizes additional context information stored as embeddings in a vector database.

11. The method of claim 10, wherein the embeddings are generated by passing content through an embedding machine learning model.

12. The method of claim 8, further comprising:

passing the first request, the content generated based on the first request, the second request, and the content generated based on the second request to the first software assistant;

causing the first software assistant to prompt the first LLM to generate content based on the content generated based on the second request, using the first request, the content generated based on the first request, the second request as context, prior to receiving any user input from the user in response to the presentation of the content generated based on the second request;

receiving content generated based on the content generated based on the second request from the first LLM; and causing presentation of the content generated based on the content generated based on the second request to the user.

13. The method of claim 8, wherein the causing presentation of the content generated based on the first request to the user includes displaying text of the content generated based on the first request in a graphical user interface.

14. The method of claim 8, wherein the causing presentation of the content generated based on the first request to the user includes converting text of the content generated based on the first request to an audio file and playing the audio file to the user.

15. A non-transitory machine-readable medium storing instructions which, when executed by one or more processors, cause the one or more processors to perform operation comprising:

creating a first persona by a first software assistant feeding a first initial instruction set to a first Large Language Model (LLM);

creating a second persona by a second software assistant, separate from the first software assistant, feeding a second initial instruction set to a second Large Language Model (LLM);

receiving a first request for first generated content from a user;

passing the first request to the first software assistant;

causing the first software assistant to prompt the first LLM to generate first content based on the first request and using the first persona;

causing presentation of the first content generated based on the first request to the user;

receiving a second request for second generated content from the user;

passing the first request, the first content generated based on the first request, and the second request to the second software assistant;

causing the second software assistant to prompt the second LLM to generate second content based on the second request and using the second persona, using the first request and the first content generated based on the first request as context, and causing presentation of the second content generated based on the second request to the user.

16. The non-transitory machine-readable medium of claim 15, wherein the first LLM and the second LLM are a shared LLM.

17. The non-transitory machine-readable medium of claim 15, wherein the first LLM utilizes additional context information stored as embeddings in a vector database.

18. The non-transitory machine-readable medium of claim 17, wherein the embeddings are generated by passing content through an embedding machine learning model.

19. The non-transitory machine-readable medium of claim 15, further comprising:

passing the first request, the content generated based on the first request, the second request, and the content generated based on the second request to the first software assistant;

causing the first software assistant to prompt the first LLM to generate content based on the content generated based on the second request, using the first request, the content generated based on the first request, and the second request as context, prior to receiving any user input from the user in response to the presentation of the content generated based on the second request;

receiving content generated based on the content generated based on the second request from the first LLM; and causing presentation of the content generated based on the content generated based on the second request to the user.

20. The non-transitory machine-readable medium of claim 15, wherein the causing presentation of the content generated based on the first request to the user includes displaying text of the content generated based on the first request in a graphical user interface.

\* \* \* \* \*